(12) United States Patent
Suzue et al.

(10) Patent No.: US 8,938,653 B2
(45) Date of Patent: Jan. 20, 2015

(54) INCREASING THE ACCURACY OF INFORMATION RETURNED FOR CONTEXT SIGNALS

(75) Inventors: Yutaka Suzue, Issaquah, WA (US); Johnson T. Apacible, Mercer Island, WA (US); Mark J. Encarnación, Issaquah, WA (US); Jamie Huynh, Seattle, WA (US); Simon D. Bernstein, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 317 days.

(21) Appl. No.: 13/325,493

(22) Filed: Dec. 14, 2011

(65) Prior Publication Data
US 2013/0159804 A1 Jun. 20, 2013

(51) Int. Cl.
| | |
|---|---|
| *G06F 11/00* | (2006.01) |
| *H04M 11/04* | (2006.01) |
| *H04W 24/00* | (2009.01) |
| *H04W 64/00* | (2009.01) |
| *H04W 4/02* | (2009.01) |

(52) U.S. Cl.
CPC ............... *H04W 64/00* (2013.01); *H04W 4/02* (2013.01)
USPC ....................... 714/746; 455/404.2; 455/456.1

(58) Field of Classification Search
CPC ....... H04W 64/00; H04W 4/02; H04W 4/021; H04W 4/025; H04W 4/028; H04W 4/03; H04W 4/06; H04W 36/32; H04W 4/26; H04W 64/006; H04W 64/003; G01S 19/05; G01S 19/06; H04L 67/18
USPC .......... 714/746, 747, 799, 699, 701; 455/404.2, 456.3, 456.1, 456.2, 450
See application file for complete search history.

(56) References Cited

U.S. PATENT DOCUMENTS

| | | | | |
|---|---|---|---|---|
| 6,950,058 | B1 * | 9/2005 | Davis et al. .............. | 342/357.42 |
| 7,468,694 | B2 * | 12/2008 | Shoarinejad ............ | 342/357.42 |
| 7,751,944 | B2 | 7/2010 | Parupudi | |
| 2002/0004399 | A1 | 1/2002 | McDonnell | |
| 2006/0004680 | A1 | 1/2006 | Robarts | |
| 2008/0045236 | A1 * | 2/2008 | Nahon et al. ............... | 455/456.1 |

(Continued)

FOREIGN PATENT DOCUMENTS

EP 2293017 A1 3/2011

OTHER PUBLICATIONS

Small, Jason, "Location Determination in a Wireless LAN infastructure", In Master's Thesis of Department of Electrical and Computer Enigineering, Carnegie Mellon University, 2000, 37 pages.

(Continued)

*Primary Examiner* — Christine Tu
(74) *Attorney, Agent, or Firm* — Steve Wight; Judy Yee; Micky Minhas (57) ABSTRACT

The subject disclosure is directed towards a technology by which the accuracy of context-based information provided by at least one data source for received context data is increased. Correctness information received in association with usage of looked up context-based information is logged. The correctness information may be processed to increase the overall accuracy by correcting a data source, and/or by creating a blended data source that includes the most likely accurate portions (segments) from among multiple data sources as determined via the correctness information.

18 Claims, 8 Drawing Sheets

(56) References Cited

U.S. PATENT DOCUMENTS

| | | |
|---|---|---|
| 2008/0147452 A1 | 6/2008 | Renz |
| 2008/0167049 A1 | 7/2008 | Karr |
| 2008/0288435 A1 | 11/2008 | Doss |
| 2010/0324813 A1 | 12/2010 | Sundararajan |
| 2011/0066646 A1 | 3/2011 | Danado |
| 2011/0070863 A1 | 3/2011 | Ma |
| 2011/0077862 A1 | 3/2011 | Huang |
| 2011/0238670 A1 | 9/2011 | Mercuri |
| 2013/0217408 A1* | 8/2013 | DiFazio et al. ............ 455/456.1 |

OTHER PUBLICATIONS

Lee, et al., "A Static Evidential Network for Context Reasoning in Home-Based Care", In Journal of IEEE Transactions on Systems, Man, and Cybernetics, Part A: Systems and Humans, vol. 40, Issue 6, Oct. 14, 2010, pp. 1232-1243.

* cited by examiner

INCREASING THE ACCURACY OF INFORMATION RETURNED FOR CONTEXT SIGNALS

BACKGROUND

Users generate contextual signals that often need to be canonicalized before being used by a software system. Examples include IP (Internet Protocol) addresses, Wi-Fi signals and cell tower information, which some software systems need to have converted into GPS locations, or into city, state, country tuples (or the like) in order to be used by those systems. Another example includes weather applications, which are based upon being given a user's GPS location. Yet another example is reverse phone directory service, where given a phone number, the service returns information (e.g., name and address) regarding the owner of that number.

In location-based and other such scenarios, there may be multiple data sources that can provide the requested information. For example, there are multiple data sources that can provide a location given an IP address; similar situations exist for Wi-Fi and cell tower mapping information. Because of the way the data were assembled and when the data were gathered, there is sometimes conflicting mapping between these sources with respect to the input signals and actual locations. For example, the same IP address may map to Washington, D.C. on one data source and to the Netherlands on another.

While a software service accepts various type of user input, canonicalization of such ambiguous signals impacts the applications that are running under the service. This is not only because it is difficult for each application to implement logic to reduce ambiguity of the signals, but also because the contextual information needs to be consistent between applications. Canonicalization usually requires a large mapping table; however it is often difficult to evaluate how accurate each such mapping table is. For example, the conversion from an IP address to a location requires a large lookup table to map ranges of IP addresses to city names, country names and so forth. While the table format is relatively simple, the size of the table is large, whereby it is essentially impractical to confirm that the mapping of each IP range is correct.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which the accuracy of context-based information provided by at least one data source from received context data is increased by processing correctness information received in association with usage of the context-based information. As a non-limiting example, a user context signal such as an IP address may be used to look up a user's likely location via a data source, and another entity (such as user feedback and/or a likely more accurate source that provides complementary location data) may provide the correctness information.

In one aspect, the context-based information provided by the one or more data sources may comprise location information that may be used to provide a result set comprising at least one location-based result. The correctness information may comprise received feedback indicative of whether the location-based result is likely correct.

In one aspect, the correctness information may be processed to increase the overall accuracy by correcting a data source if the location information is not consistent with complementary location information.

In one aspect, the correctness information may be processed to increase the overall accuracy comprises by dynamically correcting the output of a data source if the location information is known to be incorrect based upon the complementary location information.

In one aspect, the overall accuracy of a plurality of data sources may be increased by segmenting each data source into segments to provide a plurality of counterpart segments among the data sources. The correctness information may be processed to determine a measure of correctness for each counterpart segment, and select selected segments for the blended data source from among the counterpart segments based at least in part upon the measure of correctness for each counterpart segment.

In one implementation, a sampling service logs correctness data for at least some of a plurality of sample requests, in which each sample request is associated with context data. For each sample request for which information is logged, the sampling service obtains from at least one entity other than the one or more data sources, a measure of correctness related to context-based information looked up in one or more data sources based upon the context data associated with that request. The logged data may be processed to increase the overall accuracy of information returned based upon the looked up context-based information.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a technology by which the contextual signals (context data) of large numbers of user input requests are canonicalized with data sources. To this end, user requests and a measure of correctness with respect to the returned answers from data sources are used to improve the accuracy of returned data for future requests having associated context signals.

For example, a user query to a search engine may result in location-based results being returned, based upon a reverse IP address lookup (a mapping from an IP address to a location comprising city, state and country), using one of a plurality of reverse IP address databases. A measure of user satisfaction with the location-based results can be used to determine how accurate the reverse IP address lookup was, e.g., whether the user clicked on a returned location-based result (indicating likely satisfaction), or submitted another query (indicating likely dissatisfaction). By dividing each of the data sources into subsets referred to as segments and selecting the segment from each data source with the highest level of measured correctness (e.g., satisfaction), a "blended" data source may be created to return future requests with a higher level of accuracy. Further, correctness information may be used to correct a data source for more accurate output given future lookup requests.

It should be understood that any of the examples herein are non-limiting. For example, while some of the examples and description are generally directed to reverse IP address lookup, any service or services and/or one or more data sources where there is inconsistency or the possibility of error in the available results may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and providing more accurate results in general.

Figure 1:
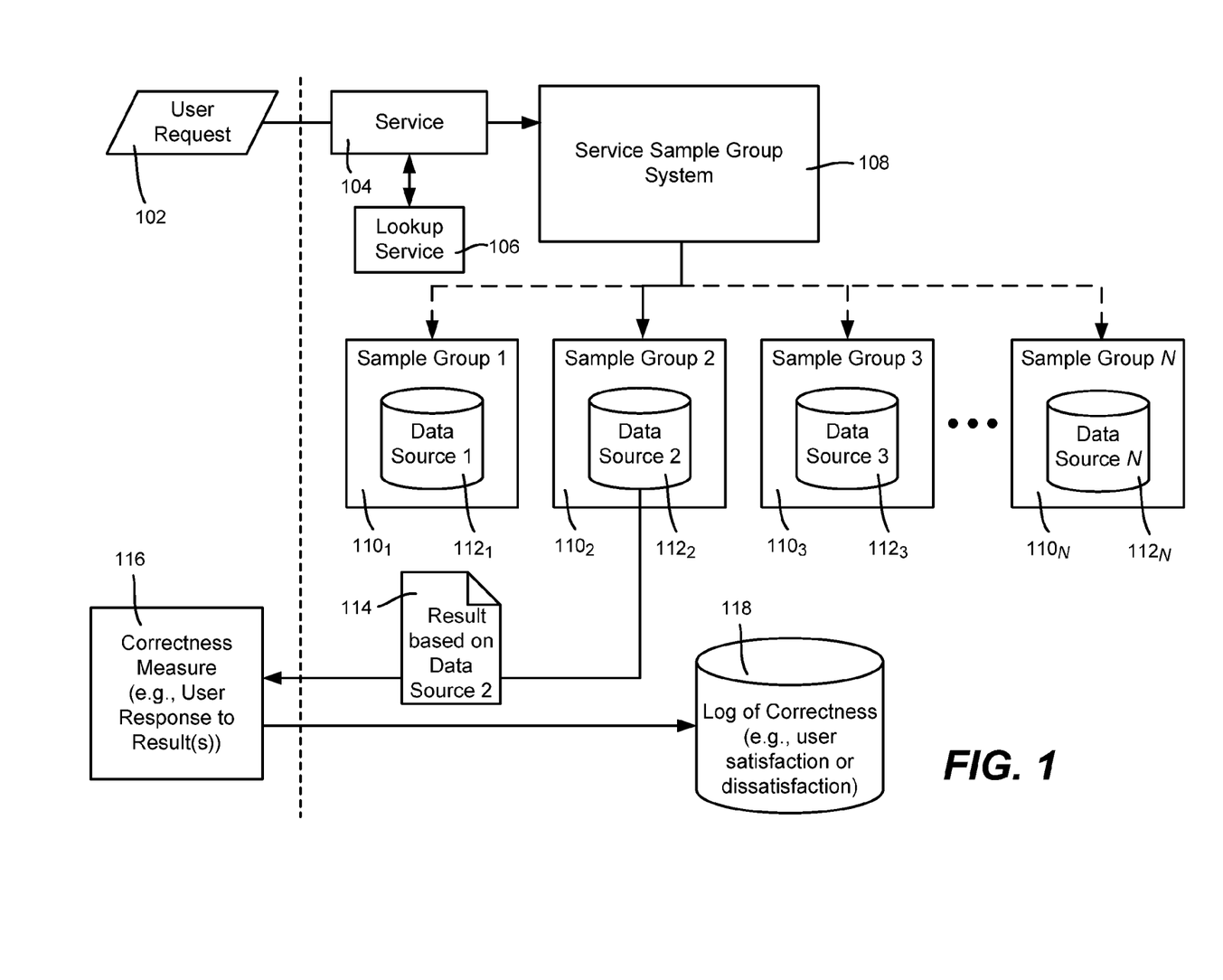
FIG. 1 is a block diagram representing example components configured to log data regarding the likely correctness of looked-up data according to one example embodiment.

FIG. 1 is a block diagram showing various components in one example implementation. In general, user requests 102 are processed by a service 104 that provides results, such as when user queries are submitted to a search engine to obtain links to relevant documents. As is understood, the service 104 sometimes obtains or accesses additional information to assist the service 104 in providing the results. For example, the service 104 may attempt to determine the location of the user, such as by providing context signals (e.g., IP address data, Wi-Fi-related data such as signals including a Wi-Fi station identifier, and/or cell tower-related data) to a lookup service 106 that takes the signals and uses them to look up and return the user location; (note that the lookup service 106 may or may not be a separate entity from the service 104). As a more particular example, given the user's IP address, a search engine may obtain the user's location from a reverse IP address lookup service, whereby the search engine is able to return results that are more relevant based upon the returned user's location.

In one implementation, the lookup service 106 may access at least one of a plurality of data sources to look up the context-based information. However, these data sources may contain errors, and thus the application or service requesting the lookup sometimes receives inaccurate information. The data sources are often inconsistent with respect to the information they maintain; for example, given an IP address, three of four data sources that the reverse IP address lookup service uses to obtain a location may contain the correct location information, while a fourth does not, and thus the accuracy of the results depends upon which data source the service uses for a given query. Simply not using that fourth data source is a poor solution, because for another IP address, that fourth data source may have the most accurate information relative to the other data sources. Where all such errors exist among the data sources is neither known in advance nor practically determinable.

As represented in FIG. 1, some of the received requests may be randomly (or otherwise) sampled to obtain information regarding the correctness of the data sources that are used to provide one or more results back to the requesting user. Thus, in the example of FIG. 1, instead of being processed as a conventional request, the user request 102 is exemplified as being selected by a service sample group system 108.

In this example, the user request 102 is grouped into one of N sample groups, where N represents the number of data sources from which information may be obtained. In the example of FIG. 1, the user request is assigned to one of N sample groups ($110_1$-$110_N$), shown via the solid line as sample group $110_2$, corresponding to data source $112_2$ of the available data sources $112_1$-$112_N$. For example, for reverse IP address lookup to establish a user's location, four data sources (N=4) are used in one implementation.

The looked up result obtained from that selected data source $112_2$ may be returned to the user via returned results 114 in some way. For example, given a search query, the search engine may look up the user's location given the user's IP address from one of four databases, in this example corresponding to the selected data source $112_2$, and tailor the search results to the location. As a more particular example, the user may query "pizza" and some of the returned results may be for document links to pizza restaurants nearby the user's location, where the location was obtained from the reverse IP address lookup performed via the data source $112_2$.

As described herein, some measure of correctness of the results 114 is determined, represented in FIG. 1 via the correctness measure 116, and used to increase the accuracy of lookups and/or future results provided in response to similar user requests. As one example, if the results were provided in response to a query, user feedback, such as the user satisfaction with those results, may be measured. The feedback may be implicit, whereby it is inferred from the user response or other behavioral actions (including taking no action), or may be explicit, e.g., via a set of one or more buttons by which the user indicates some measure of correctness, e.g., satisfied or dissatisfied.

As a more particular example of an inferred correctness measure, if some of the results are location-based and the user clicks on one of the location-based results (e.g., a pizza restaurant link), such feedback indicates that it is likely that the user was satisfied with the results, and thus that the location was more likely correct. If instead the user submitted another query without clicking a link, then the user was more likely dissatisfied, indicating that the location was more likely incorrect. This feedback/correctness information may be logged in a log 118 with similar "crowd sourced" information obtained from thousands or even millions of users, and thereafter processed to determine how accurate each data source is with respect to its IP address-based location information. As is understood, the technology benefits from having a sufficient amount of user interaction input so as to be able to observe the user's response, such as satisfaction or dissatisfaction, and draw a conclusion regarding the accuracy of the information.

Note that if the user clicks a link that is not location based, e.g., a link to a reference website showing the history of pizza, then no information may be logged because the user was likely not seeking location-related information; (it is feasible that such information may be used for other purposes, however, and thus may be logged but with a NULL or zero location correctness score, for example). Note further that if the user provides more information, such as a more refined query (e.g., "pizza in Bellevue"), that additional information can be used to improve the accuracy as well. Still further, a failure to respond may be treated as an indication of dissatisfaction (e.g., the user went to a different search engine), however this may be given less weight in scoring than a more certain indication of dissatisfaction, because perhaps the user obtained the desired information from the snippet text (such as a phone number) and therefore did not need further interaction. In any event, given a sufficient number of users, statistical trends as to the accuracy of a database (or any part thereof) based upon user satisfaction may be recognized.

Further, training and other mechanisms to determine a satisfaction/dissatisfaction scoring system may be used. For example, some amount of verified known correct (ground truth) information may be used to establish how users tend to react with known correct information, versus unverified information of the existing lookup service that may or may not be correct, including in an actual usage scenario. Known bad information (e.g., in a training or other controlled scenario so as to avoid intentionally providing bad information) may be returned to establish how users respond to incorrect information.

Figure 2:
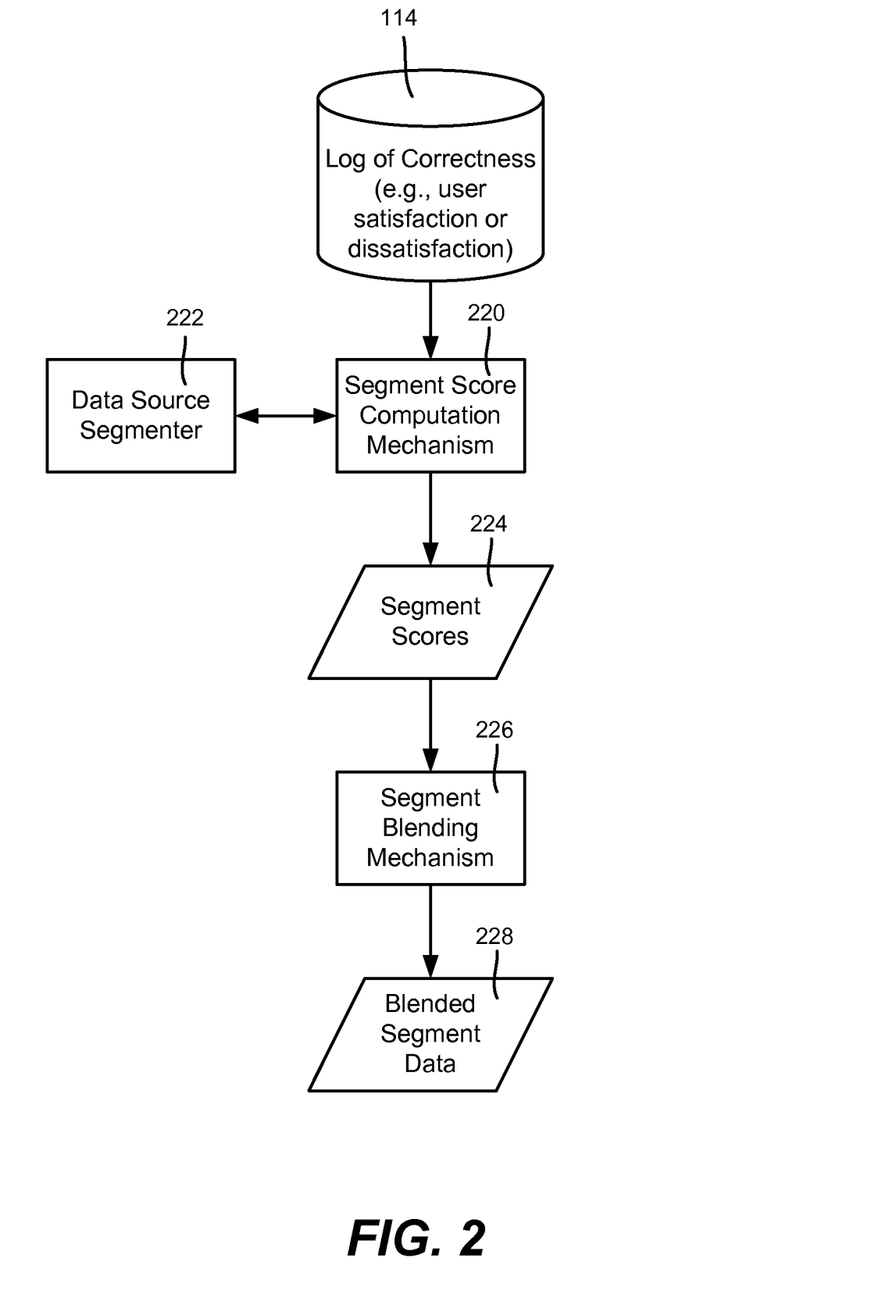
FIG. 2 is a block diagram representing one or more example components configured to process logged data in order to determine which counterpart subsets (segments) of which data sources are the most accurate ones based upon the logged data according to one example embodiment.
Figure 3:
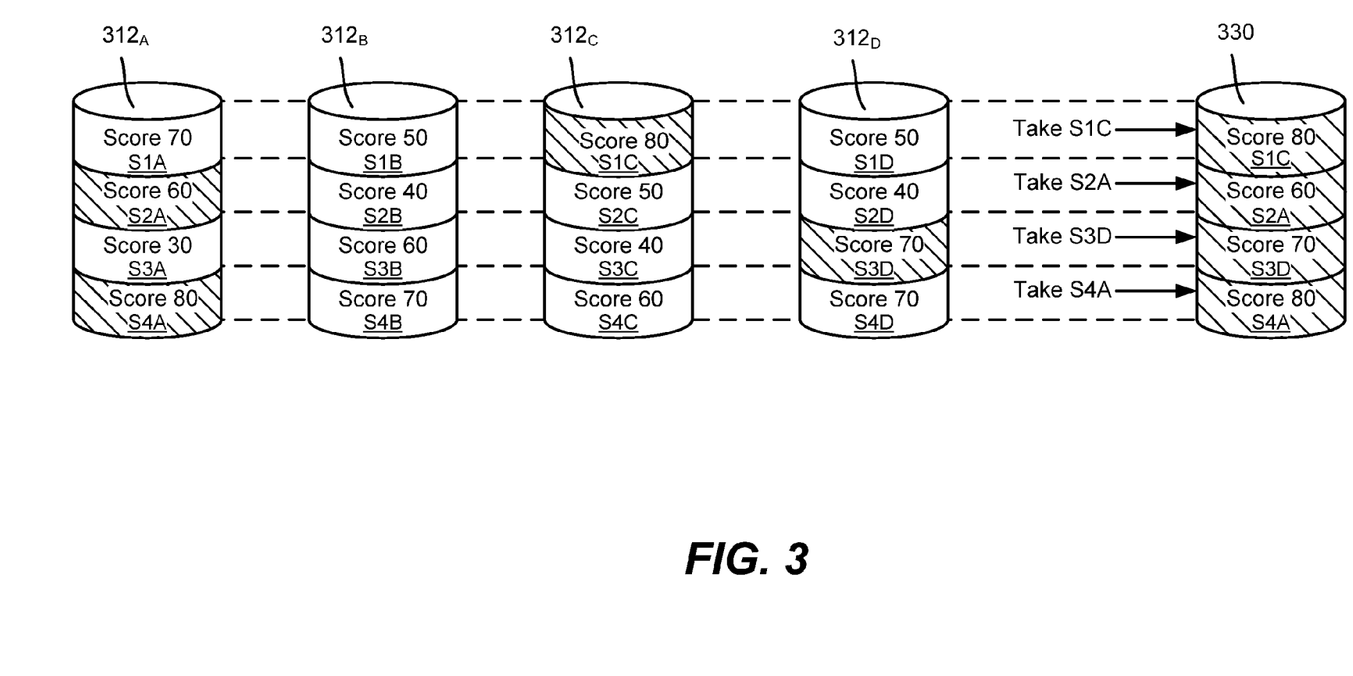
FIG. 3 is a representation of how the most accurate counterpart segments of data sources are merged into a virtual (or actual) blended data source according to one example embodiment.

FIGS. 2 and 3 illustrate one general way in which the correctness measure information, once logged, may be used. In this example, the log 118 is processed to create a "blended" data source 330 (FIG. 3) corresponding to the portions (segments) of each data source $312_A$-$312_D$ having the highest correctness score, in which correctness is based upon measured user satisfaction. In general, after collection of the correctness measure information from a relatively large number of users, the log 118 of user responses is analyzed to evaluate the quality of the data sources assigned to the sampled users.

In this example, the log 118 is processed based upon each data source being divided into subsets referred to as segments; e.g., as shown in FIG. 3, the data source $312_A$ is divided into segments S1A-S4A, the data source $312_B$ is divided into segments S1B-S4B, and so on. Thus, each segment of one data source has a counterpart segment in each other data source. For example, each segment for an IP address location lookup data source may correspond to a range of IP addresses. Note that four segments per data source are shown for simplicity in FIG. 3, however any number of segments per data source, on the order of tens, hundreds, thousands and so on may be established by the system as appropriate for a given application.

When computing the score for a data source's segment, a segment score computation mechanism 220 (FIG. 2) determines via a data source segmenter 222 to which data source and segment a correctness measure (e.g., a user satisfaction or dissatisfaction response) belongs. Note that in an alternative implementation, the data source segment for each response may be determined in advance, such as if fixed IP address ranges are predetermined, and thus the data source, segment information may be recorded at the time of logging, rather than determined from the IP address at the time of processing the log. Determining the segment at the time of processing the log may be advantageous, however, in that the segments need not be fixed ranges, and can instead be based upon other concepts such as equalizing the number of responses per segment, and so forth, which may not be known until logging is completed.

Thus, the segmenting may be based upon fixed sizes, or concepts other than fixed sizes. For example, segmenting may be based upon the number of responses, traffic equalization, and so forth. Any segment may be broken into sub-segments as desired, or two or more segments may be combined into a larger segment, including within the same data source. In this implementation, regardless of the relative sizes of the segments within each data source (e.g., in FIG. 3 the segment S2A may be different in size from the segment S3A), the data sources are each consistently partitioned such that any counterpart segments (e.g., 3SA, 3SB, 3SC and 3SD) among the data sources are the same size as one another.

As a logged entry is processed, the score computation mechanism 220 adjusts the score for that data source and segment combination based upon the correctness measure that is logged with the response data. By running the system enough times, and comparing the differences in scores based upon the users' responses, the system may judge the quality of each different data source for each segment. One example scoring mechanism is to increment the segment score for a satisfied response, and decrement the score for a dissatisfied response, and when done normalize the scores for each segment in some way if desired, such as to a percentage. In this way, processing the log 118 results in a plurality of segment scores 224, one score for each segment of each database as represented in FIG. 3 via the scores shown for segments S1A-S4D.

The scores may be used in any way, including to improve the overall system accuracy as described herein. One straightforward way to improve the overall system accuracy is based upon a blending mechanism (algorithm) that selects the counterpart segment having the highest score among each of the data sources, and then uses the selected segments to build a blended data source.

In the example of FIGS. 2 and 3, a segment blending mechanism 226 uses the segment scores 224 to select the "most accurate" segment based upon the feedback score from each of the data sources $312_A$-$312_D$, which in this example are the segments S1C, S2A, S3D and S4A, each one having the highest score relative to its counterpart segments among the other data sources. The result is blended segment data 228, corresponding to the blended data source 330 of FIG. 3. Note that in the event of a tie, which may be an actual tie or a statistical tie, a conflict resolution mechanism may be used to make the selection between segments, (e.g., use historical data, use the data source having the total highest scores, and/or the like).

Although for purposes of explanation FIG. 3 represents the blended data source 330 as a single entity that may be used for more accurate online servicing of lookups, it is understood that the system need not build an actual single data source that combines the selected segments. Rather, during online usage the service may access a mapping corresponding to the selected segments so as to dynamically choose which segment among the data sources to use based upon the blended segment data 228. For example, given an incoming IP address, which (via its IP address range) corresponds to a segment, the system accesses the blended segment data 228 so as to map that IP address to the most accurate segment for that range that was selected from among the multiple data sources, and thereby obtain the location result from that particular mapped segment. Thus, the blended data source 330 may be a virtual data source selected via the blended segment data 228 or the like rather than an actual combined physical data source.

Note that in this example scenario, once the blended segment data is obtained, in general users thereafter are given the benefit of the virtual (or possibly actual) blended data source. However, in order to again increase the accuracy, the sampling (e.g., of some small percentage of randomly selected users) to determine correctness may continue or resume at any time. For example, the sampling may be continuous, or may be occasionally turned on or off, and so forth. Sampling may be based upon some change that indicates that new correctness data is needed, such as whenever a data source is significantly changed, e.g., once a week after an update. The sampling percentage may be increased or decreased, and/or may vary over time, such as based upon one or more criteria.

While the above example was generally directed towards segmenting a plurality of data sources so as to find which segment of each data source provides the most accurate information based upon user satisfaction or dissatisfaction, other ways to measure correctness and improve accuracy may be performed. For example, the correctness may be based on other known information that is known to be more accurate. Further, while multiple data sources may benefit from the logged information as described above, even only a single data source may be corrected.

By way of example, consider that a data source maintains a mapping between locations and Wi-Fi signals, e.g., so as to map which Wi-Fi stations/access points (or simply access points in this example description) are in what locations. Location of an entity may thus be determined based upon the access point in use. However, from time to time access points may be moved, whereby any previously mapped location is not correct unless the data source is updated.

If the access point location is used to provide a location that is used in providing search results, a user's reaction to those results is one possible way to determine correctness of the stored access point location, as generally described above with respect to similar IP address-based location lookup. However other correctness information may be available. For example, consider a user who is using a smartphone for wireless networking via the access point, whereby the access point location may be looked up. Instead of (or in addition to) any user satisfaction measure, GPS data and/or cellular-determined location data (e.g., based upon signal strength/triangulation) may be used, if available, to obtain a complementary location for verifying whether the data source's stored location is correct versus the complementary location data. Because the data sources are not necessarily accurate, the contexts (e.g., locations) may conflict; U.S. Pat. No. 7,444, 594, hereby incorporated by reference, generally describes mediating conflicts in a computer user's context data.

Another way to get user feedback is if the user changes his or her setting or other input on a device (e.g., smartphone) to get a more accurate location. For example, if using Wi-Fi access point data to obtain a location and the user queries for "pizza", and after getting search results the user changes the query to "pizza 98040", (where "98040" represents a zip code), then this may be a signal that can be used to indicate user dissatisfaction with the location.

Figure 4:
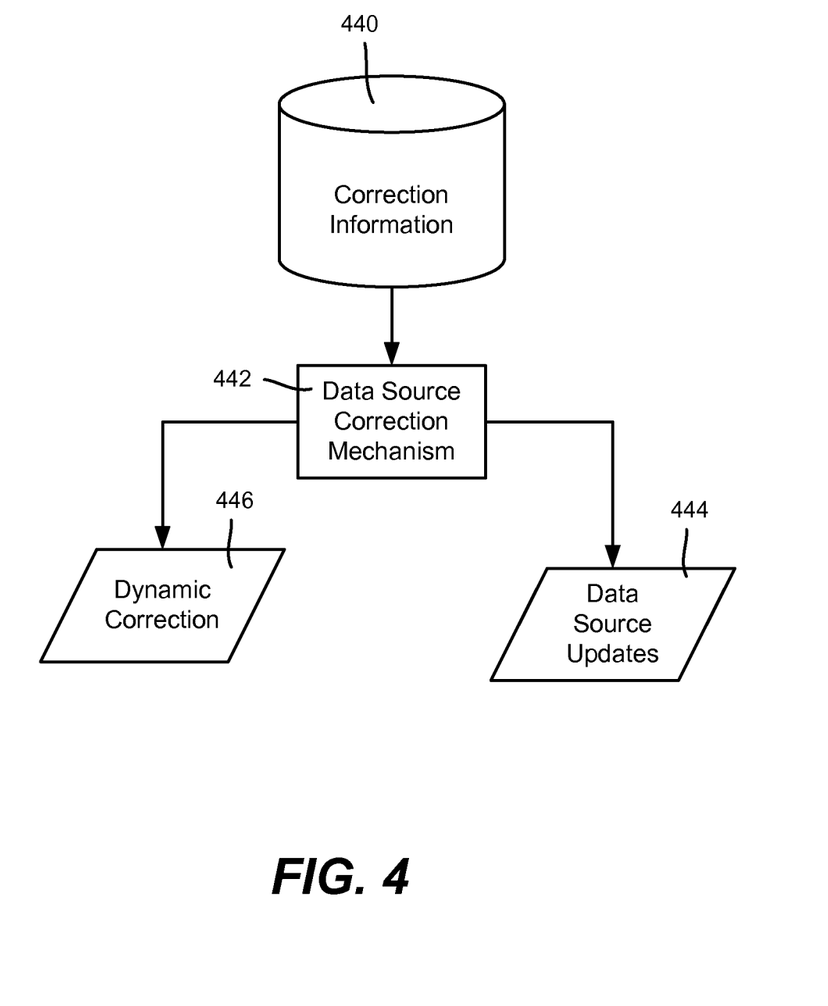
FIG. 4 is a block diagram representing one or more example components configured to process logged data in order to correct a data source according to one example embodiment.

As represented in FIG. 4, such correction information 440 obtained from one source may be used to correct another data source, such by logging the correction information 440 with other such information and updating the other data source at an appropriate time. This is represented in FIG. 4 via the data source correction mechanism 442 providing data source updates 444.

Notwithstanding, any data source correction may be more dynamic. For example, consider that a GPS to latitude, longitude data source is detected by another beacon (e.g., a cellular beacon) as being off by some distance in a given direction for a certain location. Dynamic correction data 446 may be applied to any output of that GPS to latitude, longitude data source, e.g., as an offset, to correct the output and provide a more accurate location for future lookup requests.

Figure 5:
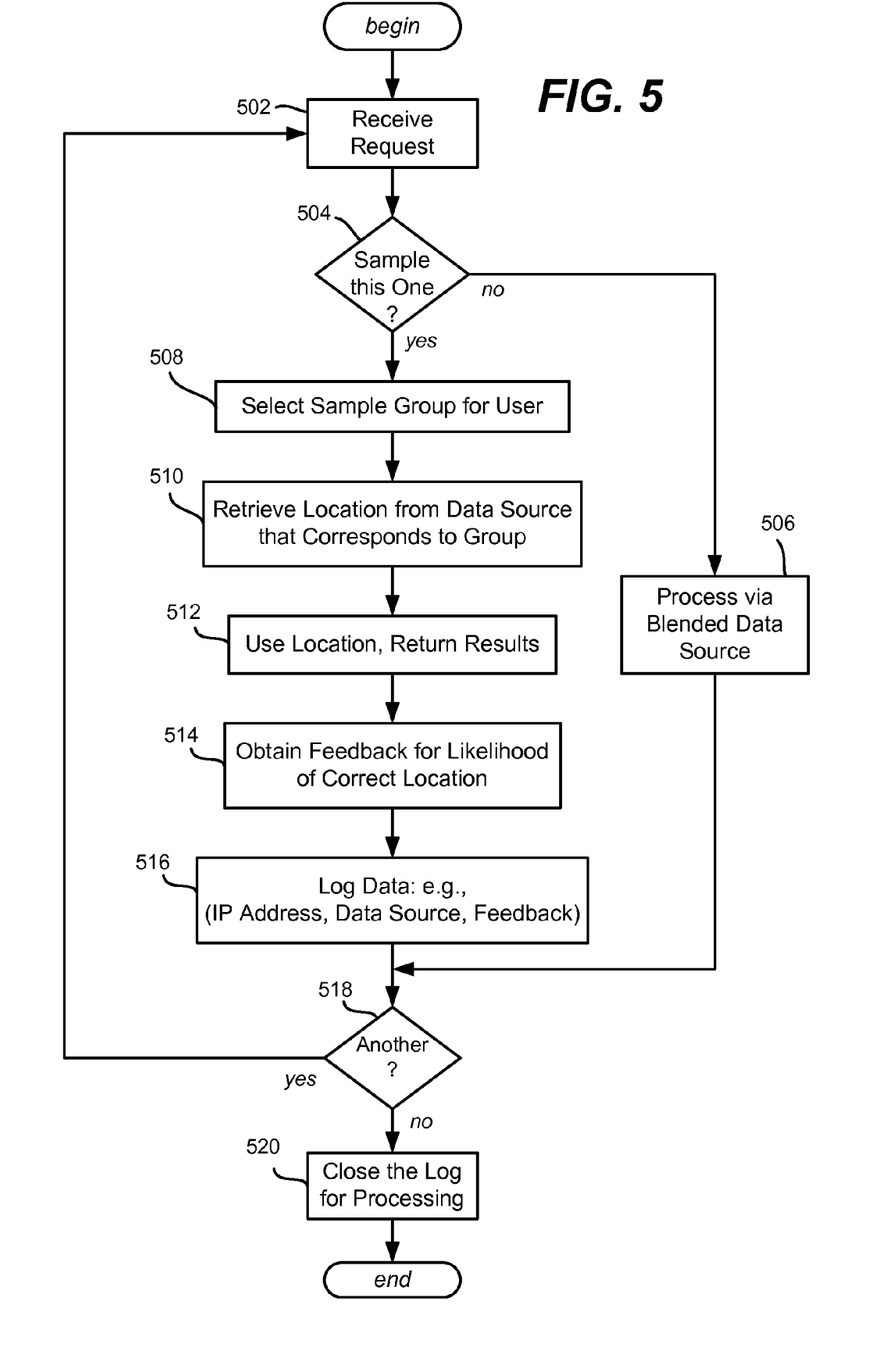
FIG. 5 is a flow diagram representing example steps for collecting user satisfaction feedback logged with respect to IP address-based (or other) location lookup results according to one example embodiment.

FIG. 5 is a flow diagram summarizing various example steps related to collecting user feedback with respect to location-based results returned to the user, e.g., in response to a search query, beginning at step 502 where a user request is received. Step 504 determines whether to sample this request. Note that typically most user requests are not sampled, and instead their requests are processed via a previously created blended data source at step 506, (or in the conventional way until a blended data source is initially created as described herein).

As described herein, at least some user requests are selected for sampling. The selection may be based upon any scheme, such as one out of every hundred user requests, whereby the sampled IP addresses are generally randomly received. Another example scheme may be based upon IP address distribution, e.g., to try to obtain a somewhat equal number of samples for each IP address range. Other mechanisms for selection may be used in conjunction with these and other schemes, e.g., perform filtering before considering sampling, such as to only sample IP addresses that are supposed to map to United States locations.

For a user selected for sampling, step 508 determines a sample group, corresponding to one of the data sources, for that user. This selection may be by round robin distribution, by random distribution, or any other scheme. For an example of another scheme, rather than balance the number of total responses among sample groups/data sources, more users may be selected for a given sample group/data source so as to balance the number of location-based satisfaction or dissatisfaction type responses, (e.g., as not all logged responses may correspond to location-based links).

Step 510 obtains the location information from the data source, which is then used to return one or more results at step 512. For a search, some of the returned links to documents, advertisements and so forth may be location based, given the looked up location information.

Step 514 represents obtaining feedback from the user based upon the returned results. The data are logged at step 516, e.g., the IP address of the user (or possibly the segment if the ranges are fixed), the data source to which the user was assigned, and the feedback of the user. The feedback may be a score or the like, e.g., a one if the user response indicated the user was satisfied and a minus one if dissatisfied, in which event step 514 also represents determining the score or the like as part of obtaining the feedback.

Step 518 repeats the process for as many user requests as desired, such as a fixed number, until the log is full, based upon a time window, or the like. Note that there may be many similar processes operating in parallel, writing to the same log, or to different logs that are combined later. Step 520 represents closing the log for further processing, e.g., to perform the analysis for blending segments as described with reference to FIGS. 2 and 3 above, and FIG. 6 below.

Figure 6:
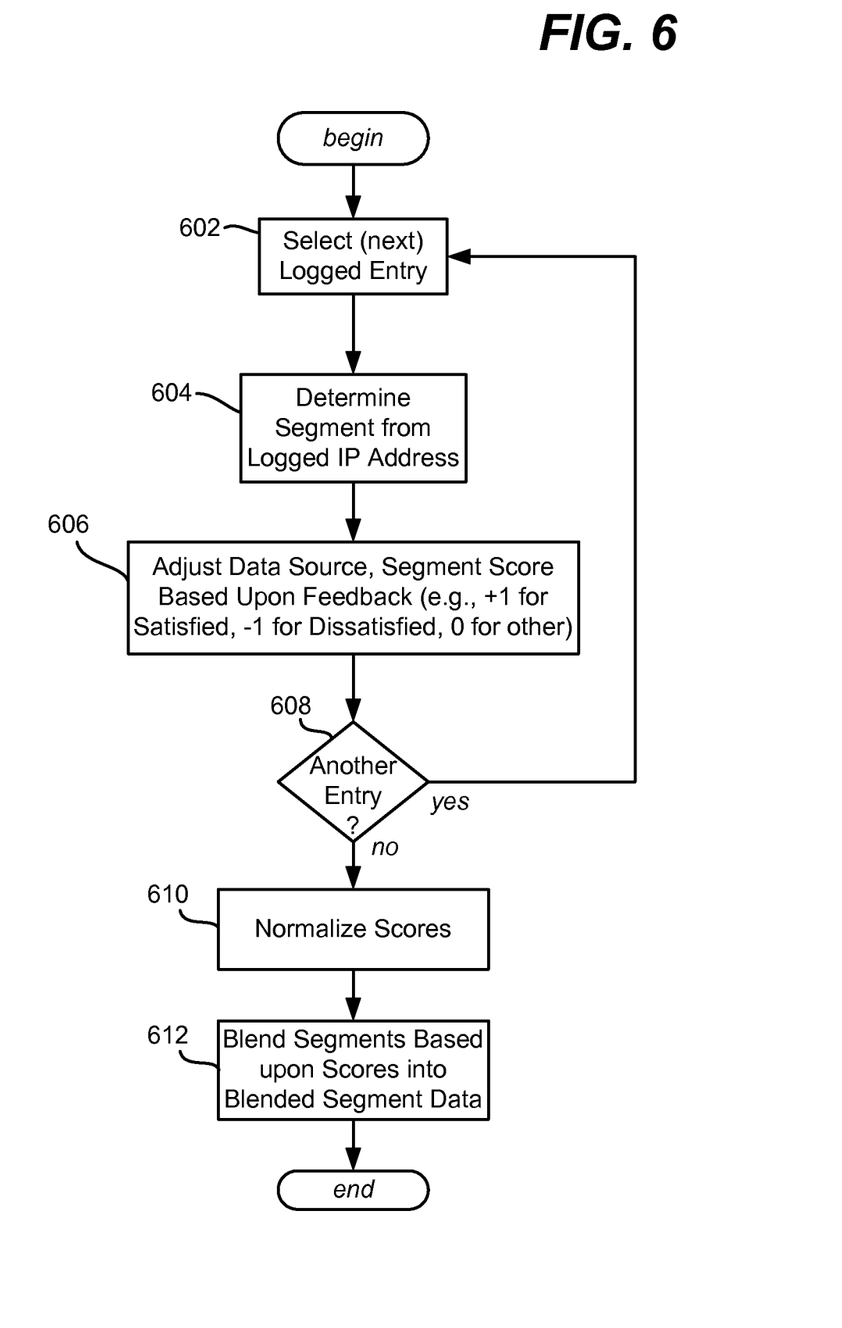
FIG. 6 is a flow diagram representing example steps for processing logged user feedback to determine which data source segments are most accurate based upon the feedback to create a blended data source according to one example embodiment.

FIG. 6 represents example steps of a flow diagram for performing an example data source blending, beginning at step 602 where each logged entry is selected for processing.

Step 604 determines the segment from the logged IP address, unless as described above the segment for this entry is known in advance and already logged.

Step 606 represents adjusting the score for this entry's data source, segment based upon the feedback, such as incrementing a running total if satisfied, or decrementing the total if dissatisfied. Another scheme is to keep running totals for the response count and the count of satisfied responses. If the scoring scheme was not implemented as part of logging, then step 606 also represents the implementing of the scoring scheme, e.g., converting a logged user action (click or new query, or possibly other action or inaction) into a value for adjusting the segment's score.

Step 608 repeats the log processing until the log is processed and scores are obtained for each segment of each data source. Step 610 represents normalizing the scores if necessary, such as to account for an unequal number of relevant responses among counterpart segments.

Step 612 blends the segments, e.g., virtually, into the blended segment data. At this point, an initial or updated blended source is available for use in handling requests.

As can be seen, there is thus described a scalable way to improve the accuracy of information returned that involves an associated lookup. This may include mediating between potentially conflicting data sources having unknown accuracy, using inferred or explicit crowd-sourced data.

Example Networked And Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 7:
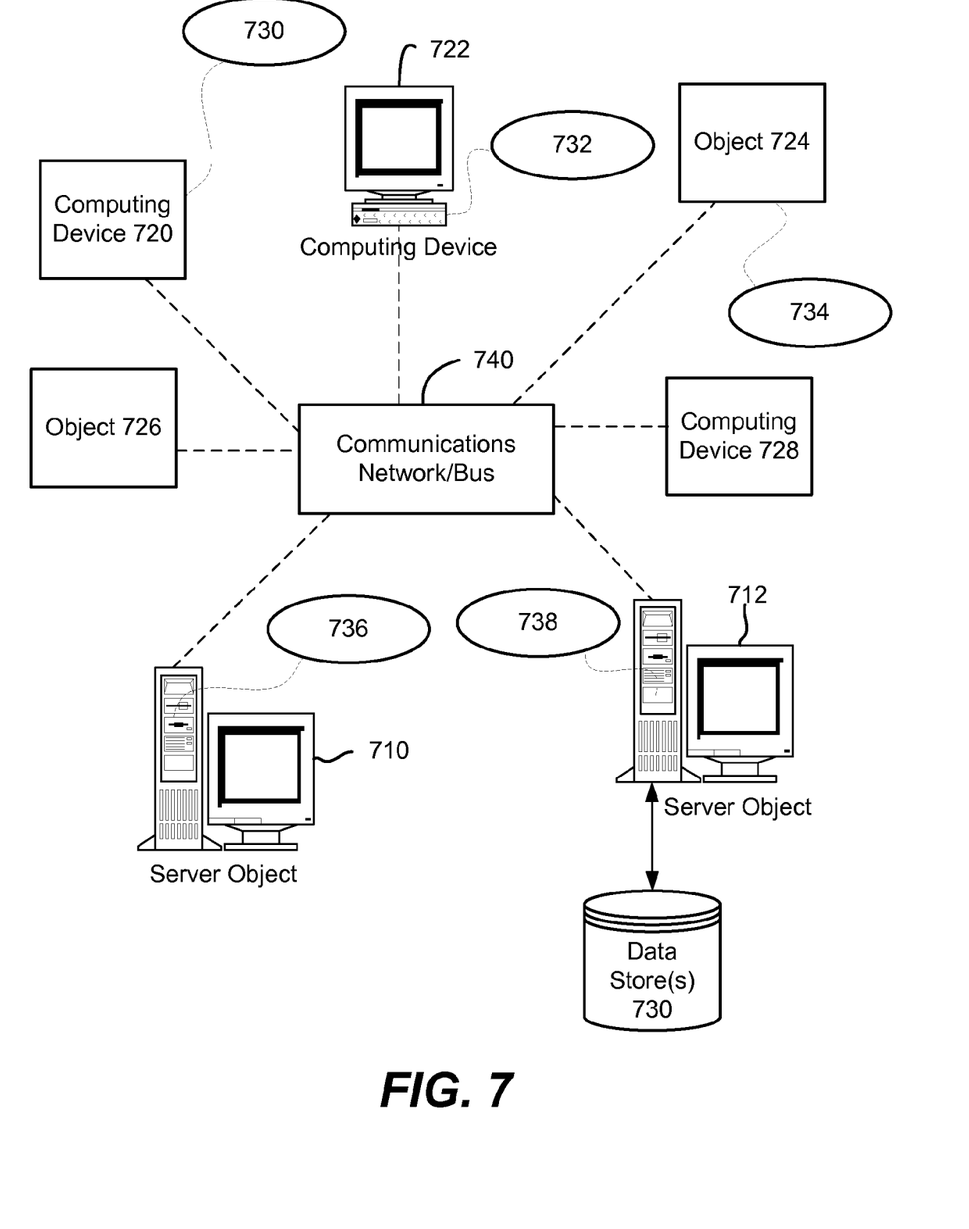
FIG. 7 is a block diagram representing example non-limiting networked environments in which various embodiments described herein can be implemented.

FIG. 7 provides a schematic diagram of an example networked or distributed computing environment. The distributed computing environment comprises computing objects 710, 712, etc., and computing objects or devices 720, 722, 724, 726, 728, etc., which may include programs, methods, data stores, programmable logic, etc. as represented by example applications 730, 732, 734, 736, 738. It can be appreciated that computing objects 710, 712, etc. and computing objects or devices 720, 722, 724, 726, 728, etc. may comprise different devices, such as personal digital assistants (PDAs), audio/video devices, mobile phones, MP3 players, personal computers, laptops, etc.

Each computing object 710, 712, etc. and computing objects or devices 720, 722, 724, 726, 728, etc. can communicate with one or more other computing objects 710, 712, etc. and computing objects or devices 720, 722, 724, 726, 728, etc. by way of the communications network 740, either directly or indirectly. Even though illustrated as a single element in FIG. 7, communications network 740 may comprise other computing objects and computing devices that provide services to the system of FIG. 7, and/or may represent multiple interconnected networks, which are not shown. Each computing object 710, 712, etc. or computing object or device 720, 722, 724, 726, 728, etc. can also contain an application, such as applications 730, 732, 734, 736, 738, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 7, as a non-limiting example, computing objects or devices 720, 722, 724, 726, 728, etc. can be thought of as clients and computing objects 710, 712, etc. can be thought of as servers where computing objects 710, 712, etc., acting as servers provide data services, such as receiving data from client computing objects or devices 720, 722, 724, 726, 728, etc., storing of data, processing of data, transmitting data to client computing objects or devices 720, 722, 724, 726, 728, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 740 or bus is the Internet, for example, the computing objects 710, 712, etc. can be Web servers with which other computing objects or devices 720, 722, 724, 726, 728, etc. communicate via any of a number of known protocols, such as the hypertext transfer protocol (HTTP). Computing objects 710, 712, etc. acting as servers may also serve as clients, e.g., computing objects or devices 720, 722, 724, 726, 728, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 8 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 8:
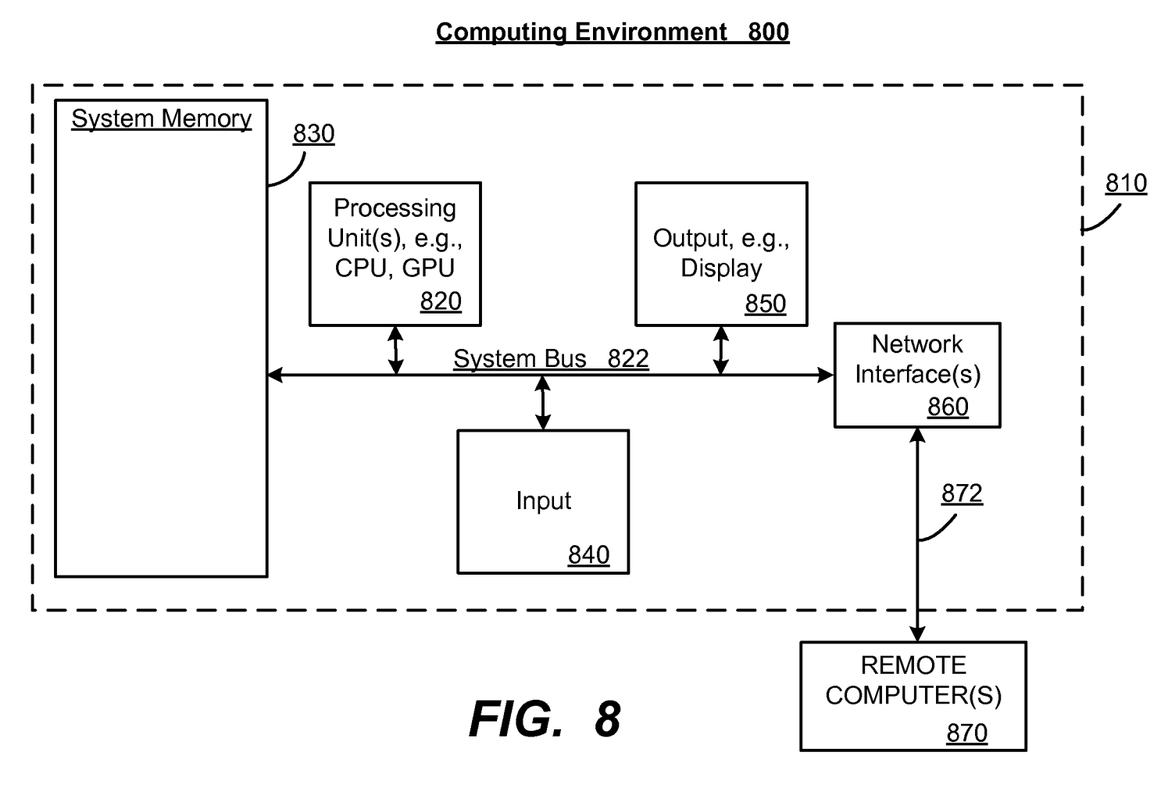
FIG. 8 is a block diagram representing an example non-limiting computing system or operating environment in which one or more aspects of various embodiments described herein can be implemented.

FIG. 8 thus illustrates an example of a suitable computing system environment 800 in which one or aspects of the embodiments described herein can be implemented, although as made clear above, the computing system environment 800 is only one example of a suitable computing environment and is not intended to suggest any limitation as to scope of use or functionality. In addition, the computing system environment 800 is not intended to be interpreted as having any dependency relating to any one or combination of components illustrated in the example computing system environment 800.

With reference to FIG. 8, an example remote device for implementing one or more embodiments includes a general purpose computing device in the form of a computer 810. Components of computer 810 may include, but are not limited to, a processing unit 820, a system memory 830, and a system bus 822 that couples various system components including the system memory to the processing unit 820.

Computer 810 typically includes a variety of computer readable media and can be any available media that can be accessed by computer 810. The system memory 830 may include computer storage media in the form of volatile and/or nonvolatile memory such as read only memory (ROM) and/or random access memory (RAM). By way of example, and not limitation, system memory 830 may also include an operating system, application programs, other program modules, and program data.

A user can enter commands and information into the computer 810 through input devices 840. A monitor or other type of display device is also connected to the system bus 822 via an interface, such as output interface 850. In addition to a monitor, computers can also include other peripheral output devices such as speakers and a printer, which may be connected through output interface 850.

The computer 810 may operate in a networked or distributed environment using logical connections to one or more other remote computers, such as remote computer 870. The remote computer 870 may be a personal computer, a server, a router, a network PC, a peer device or other common network node, or any other remote media consumption or transmission device, and may include any or all of the elements described above relative to the computer 810. The logical connections depicted in FIG. 8 include a network 872, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one processor, comprising:
    providing context signals associated with a mobile device to at least one data source;
    receiving context-based information corresponding to the context signals from the at least one data source;
    receiving correctness information corresponding to accuracy of the context-based information from a correctness measure based on crowd-sourced feedback; and
    processing the correctness information to generate a blended data source to increase an overall accuracy corresponding to other context-based information provided by the at least one data source for other received context signals.

2. The method of claim 1 wherein receiving the context-based information further comprises receiving location information, and using the location information to provide a result set comprising at least one location-based result, wherein receiving the correctness information comprises receiving feedback indicative of whether the location-based result is likely correct.

3. The method of claim 1 wherein receiving the context-based information comprises receiving location information, wherein receiving the correctness information comprises receiving complementary location information from a likely more accurate data source, and wherein processing the correctness information to increase the overall accuracy comprises correcting the at least one data source if the location information is not consistent with the complementary location information.

4. The method of claim 1 wherein receiving the context-based information comprises receiving location information, wherein receiving the correctness information comprises receiving complementary location information from a likely more accurate data source, and wherein processing the correctness information to increase the overall accuracy comprises dynamically correcting output of the at least one data source if the location information is known to be incorrect based upon the complementary location information.

5. The method of claim 1 wherein receiving the context-based information comprises receiving Internet protocol (IP) address data that is used to obtain location information, and wherein receiving the correctness information comprises receiving user feedback indicative of whether the user was satisfied or dissatisfied with a result set that includes at least one result based upon the location information.

6. The method of claim 1 further comprising:
    logging the correctness information received from the correctness measure for each of a plurality of data sources.

7. The method of claim 6 wherein the at least one data source comprises a plurality of independent data sources that each contain at least some inaccurate data, and wherein processing the correctness information to increase the overall accuracy comprises processing the logged correctness information of the plurality of data sources to create a blended data source from among the plurality of data sources, including, segmenting each data source into segments to provide a plurality of counterpart segments among the plurality of data sources, determining a measure of correctness for each counterpart segment, and selecting selected segments for the blended data source from among the counterpart segments based at least in part upon the measure of correctness for each counterpart segment.

8. A system comprising:
    a memory;
    at least one processor coupled to the memory;
    a service, implemented on the at least one processor, configured to provide context data to a plurality of data sources, receive context-based information from each of the plurality of data sources, receive correctness information from a correctness measure, the correctness information corresponding to the accuracy of the context-based information from each of the plurality of data sources, and process the correctness information to generate a blended data source having the highest accuracy of the context-based information.

9. The system of claim 8, further comprising:
    a correctness log located in the memory and configured to store the correctness information corresponding to the context-based information from each of the plurality of data sources, wherein processing the correctness information includes segmenting each data source from the plurality of data sources to provide a plurality of counterpart segments among the plurality of data sources, determining a measure of correctness for each counterpart segment, and selecting segments for the blended data source from among the counterpart segments based at least in part upon the measure of correctness for each counterpart segment.

10. The system of claim 8, further comprising:
a data source segment mechanism configured to segment each data source from the plurality of data sources to provide a plurality of counterpart segments among the plurality of data sources;
a segment score computation mechanism configured to determine a measure of correctness for each of the plurality of counterpart segments; and
a blending mechanism configured to select a counterpart segment from the plurality of counterpart segments having the highest measure of correctness and use selected segments to build the blended data source.

11. The system of claim 8, further comprising:
a data source segment mechanism configured to segment each data source from the plurality of data sources to provide a plurality of counterpart segments among the plurality of data sources;
a segment score computation mechanism configured to determine a measure of correctness for each of the plurality of counterpart segments; and
a mapping mechanism configured to dynamically select a counterpart segment from the plurality of counterpart segments having the highest measure of correctness and use selected segments to provide a result.

12. The system of claim 8, further comprising:
a correctness log located in the memory and configured to store the correctness information corresponding to the context-based information from each of the plurality of data sources; and
a data source correction mechanism configured to process the stored correctness information of the correctness log to provide updates to one or more of the plurality of data sources.

13. The system of claim 8, further comprising:
a correctness log located in the memory and configured to store the correctness information corresponding to the context-based information from each of the plurality of data sources; and
a data source correction mechanism configured to process the stored correctness information of the correctness log to provide dynamic correction data for one or more of the plurality of data sources.

14. One or more computer storage devices having computer-executable instructions, which when executed by a computer, cause the computer to perform steps comprising:
providing context data associated with a computing device to at least one data source;
receiving context-based information corresponding to the context data from the at least one data source;
receiving correctness information corresponding to accuracy of the context-based information from a correctness measure based on at least one of explicit or implicit feedback; and
processing the correctness information to increase an overall accuracy corresponding to other context-based information provided by the at least one data source for other received context data.

15. The one or more computer storage devices of claim 14, wherein the correctness measure comprises user feedback.

16. The one or more computer storage devices of claim 14 having further computer-executable instructions comprising:
logging the correctness information received from the correctness measure, wherein the at least one data source comprises a plurality of data sources, and wherein processing the correctness information to increase the overall accuracy comprises processing the logged correctness information corresponding to the plurality of data sources to generate a blended data source from among the plurality of data sources.

17. The one or more computer storage devices of claim 14 wherein the at least one data source comprises a plurality of data sources, and wherein processing the correctness information further comprises:
segmenting each data source into segments to provide a plurality of counterpart segments among the plurality of data sources;
determining a measure of correctness for each counterpart segment; and
selecting segments for a blended data source from among the counterpart segments based at least in part upon the measure of correctness for each counterpart segment.

18. The one or more computer storage devices of claim 14 having further computer-executable instructions comprising:
converting a logged user action corresponding to the context-based information into a value associated with the correctness measure.

* * * * *